United States Patent Office 3,296,403
Patented Jan. 3, 1967

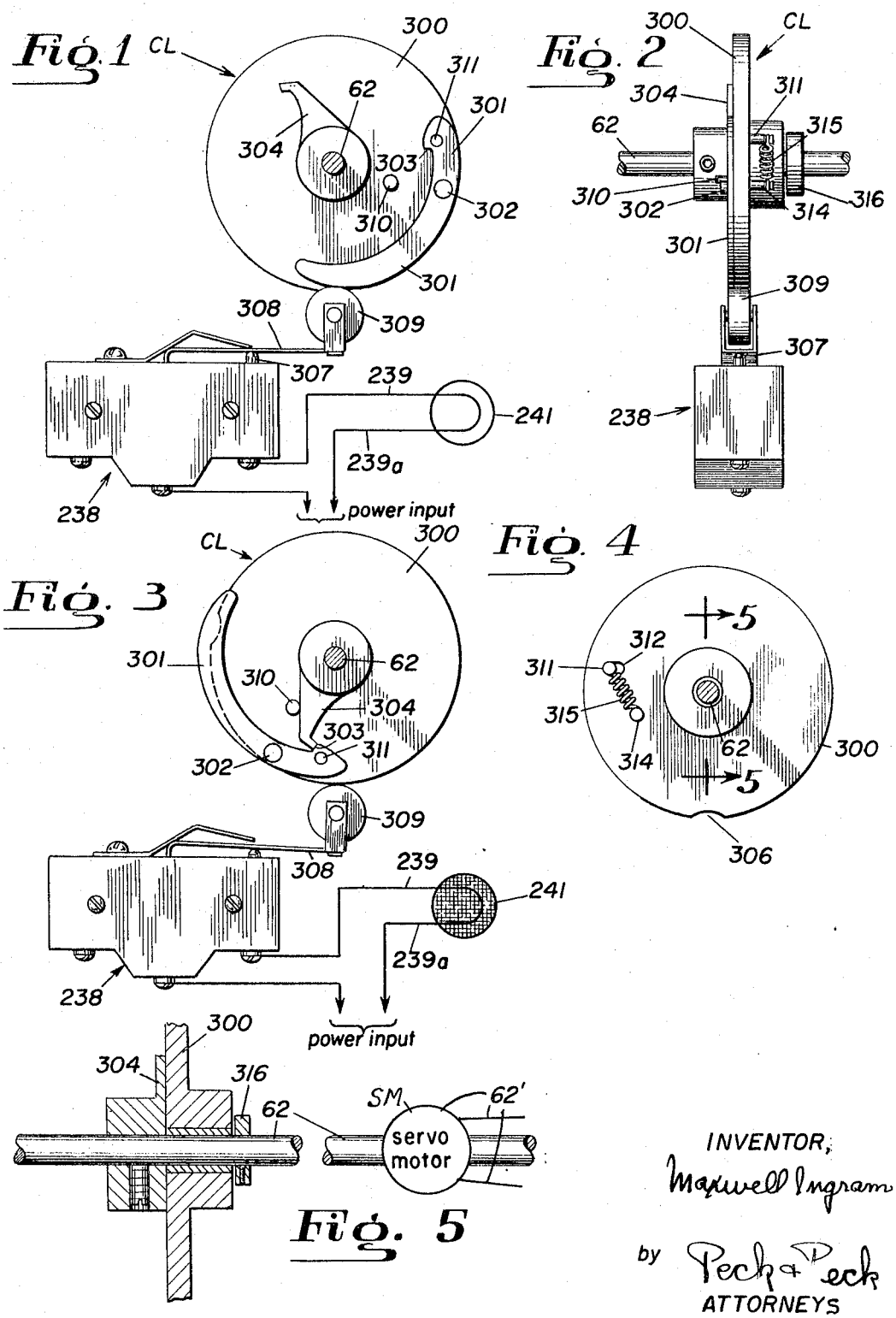

3,296,403
MEANS FOR OPERATING A ROTATION
INDICATING SWITCH
Maxwell Ingram, Dumount, N.J. 07628
Original application Sept. 28, 1962, Ser. No. 226,866.
Divided and this application Jan. 25, 1965, Ser. No.
427,904
5 Claims. (Cl. 200—153)

This application constitutes a divisional application of my pending application Ser. No. 226,866, filed Sept. 28, 1962, for Direct Reading Shaft Horsepower Meter System and Methods.

My aforementioned parent application Ser. No. 226,866 relates generally to a system and methods for continuously determining and constantly indicating, as well as permanently recording and integrating the horsepower output developed through and by a powered rotary driving shaft or equivalent member of a powered prime mover so that at any moment during operation of such powered shaft one can instantly visually determine and read the horsepower output at the moment of reading, while at the same time a permanent record is being made of the horsepower output of the shaft and shaft horsepower hours are being totalized throughout and during the period of operation thereof.

While such systems have general industrial utility they have particular utility and value in the operation of propeller driven ships for the most efficient operation of such a ship, and it is in connection with the operation of propeller driven ships that the system has been described in my application Ser. No. 226,866.

In the development of the system as described in my aforesaid parent application I designed, and have disclosed and claimed in said application a latching cam assembly which has broad application and is not adaptable for and usable only with the particular system disclosed in said parent application, although its use in such systems is significant and important.

In the system for determining and indicating the actual horsepower output of a powered driving shaft I have found that it is highly desirable to provide an efficient non-repetitive microswitch cam and latching assembly and circuitry for indicating by alarm light (or other signal) when the torque in the shaft is astern in direction, irrespective of shaft rotation, so that in the case of a propeller shaft of a ship, the alarm light, or other signal, will be activated when the torque is in the direction for astern direction when slowing down propeller through its shaft by power when in ahead rotation.

The above sets forth in broad terms one of many uses to which my latching cam assembly may be put. As will become clear as this description proceeds the latching cam assembly is mounted on a rotary member which is limited in its rotary travel in either direction, and the latching cam assembly is so constructed that it will only operate when the rotary member is being rotated in one direction. The latching cam assembly is non-repetitive in its action. The latching cam assembly of this invention has been designed to execute its motions and to function within a limited scope of rotations of the shaft, which though relatively wide, are not indefinitely continuous in one direction.

It is to be understood, and all skilled in this art, will recognize, that any suitable means may be provided for limiting the rotation of the shaft in one direction, and of course such means will depend upon the particular adaptation of the assembly. The means, which I have disclosed herein, is merely by way of example, and not of limitation.

This latching cam assembly has been specifically employed in a shaft horsepower system in conjunction with the torque read-out shaft to indicate when the astern torque is applied to the ship's shaft irrespective of the ship's shaft rotation. By this method, the indication is independent of the direction of the ship's shaft and may be remotely located from it since it is completely disassociated physically but connected electrically, as disclosed in my aforesaid pending application.

In another instance this cam assembly may be employed on ship's shaft horsepower meters which have a variable pitch propeller where the torque and revolution or direction of rotation of the ship's shaft are always in the same direction. This cam assembly may be used to close an electrical alarm circuit when the torque and the ship's shaft reaches above the allowable maximum. This cam assembly is made to be positioned at the point of maximum allowable torque for a particular ship's installation. In lieu of an alarm, a solenoid or hydraulic valve operative device can operate on the variable pitch controls to provide a feed back to reduce the pitch of the propeller with subsequent reduction in torque to a set level. Another use is to employ the same device to assist in operating the engines so that an engine will produce power until it reaches a pre-set torque which will feed back to the engine and maintain it at a pre-set torque based on the setting on this cam assembly. In other words, this cam assembly will be used as a means for controlling the allowable maximum output and maintaining it at a particular level as pre-set. This is signficant in view of the fact that ships have become automated and the men at controls have been reduced to a minimum. By the pre-setting of this assembly the controls can be governed by the output of the shaft horsepower meter with respect to the maximum allowable or pre-set torque for the ship's shaft. This will prevent damage to the turbines and the mechanical systems in the ship's engine and equipment. Simultaneously, it can be used for alarming as well as controls if two sets of cams, in opposition, are used or if the same cam action is effected to produce two different signals, namely, one for ahead and one for astern. Many variations of this cam may be made to suit the particular conditions.

It is also within my contemplation to use this latching cam assembly where a circuit is to be made or interrupted and/or cam action latching in sequence and adjustable for different positions of rotation at pre-set points.

My latching cam assembly can be used where a circuit for an alarm, control and indication are to be made and maintained or interrupted and/or cam action latching on either side equally, of a center point having slightly less than 180° rotation in opposite directions from a center point. This action is made without repetition.

This development may also be used where a circuit for an alarm, control and indication is to be made and maintained or interrupted and/or cam action latching on either side, unequally of a point having rotation more than 180° on one side and less than 180° rotation in the opposite direction from the set point. This action is made without repetition.

A further significant use of my invention is where a circuit such as an alarm, control and indication is to be made and maintained or interrupted and/or cam act latching on either side, equally, of a center point having slightly less than 360° rotation in opposite directions from the center point. This action is made without repetition.

This latching cam assembly finds use in a circuit such as an alarm, control and indication is to be made and maintained or interrupted and/or cam action latching on either side of a set point having more than 360° on one side and comparably less than 360° in the opposite direction from this set point. This action is made without repetition.

This invention is highly useful where multple circuits are to be made or interrupted in different sequences as well as cam action and at different positions of angular rotations and at pre-set points.

The assembly may also be adjusted to actuate a circuit when prescribed limits of rotation are reached in one direction with a single cam assembly; and both directions, when two cam assemblies are used back to back on the same shaft.

This type cam assembly can also be used mechanically, having a different cam surface configuration to suit an application to operate on and control linkages, levers, rollers, cam followers, etc., to operate the following mechanically: pantagraph, electro-mechanical equipment controls, functional apparatus and other types of actuated equipment.

The latching cam assembly can also be employed to operate electrical, mechanical, pneumatic and hydraulic controls individually, in sequence and in multiple.

This latching cam assembly is simple in construction and operation, reliable, maintenance free, easily adjusted and inexpensive to manufacture.

This invention can also indicate and actuate to call attention to the direction of a shaft rotation. This cam assembly can also indicate and actuate to call attention to its magnitude of rotation.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a side elevation, more or less diagrammatic, of the indicating lamp controlling microswitch and the cam latching assembly for selective control of such switch.

FIG. 2 is an end elevation of the switch and cam latching assembly of FIG. 1.

FIG. 3 is a side elevation of the switch and cam latching assembly similar to FIG. 1 but showing the cam latching assembly in operative position during operation of the shaft in one direction with the switch in lamp circuit closing position and the lamp lit thereby, the lamp and circuit being schematically shown.

FIG. 4 is a side elevation of the opposite side of the cam latching assembly from the side thereof shown in FIGS. 1 and 3.

FIG. 5 is a detailed sectional view taken partially on the line 5—5 of FIG. 4, and with the addition thereto of a limiting means for limiting the rotation of the shaft in one direction.

In the accompanying drawings I have designated the micro-switch, the operability of which is controlled by my cam latching assembly, by the reference numeral 238, and this switch is of the normally open type and is actuated by the cam latching assembly which is identified in its entirety by the reference numerals CL as illustrated in FIGS. 1–3 of the drawings. I provide an indicating lamp 241 which is preferably amber in color and is connected to and across the conductors 239 and 239a which are connected with the micro switch 238 in a conventional manner. This cam latching assembly CL will be described in more detail hereinafter.

When the contacts of the micro-switch 238 are closed the circuit through the indicator lamp 241 is closed, and this lamp is illuminated to indicate that the torque being applied to the shaft 62 is in one direction. When the torque being applied to the shaft is in the opposite direction, the microswitch 238 is in its normal open position, thereby opening the circuit through the indicator lamp 241 so that this lamp is extinguished and is not visible to the operator. In one application of this latching cam assembly where the lamp 241 indicates that an astern torque is being applied to a ship's propeller shaft in the manner as disclosed in my aforesaid pending application so that the lamp 241 functions as an astern lamp, it will be recognized that when this lamp is illuminated it calls to the attention of the operator that the torque being then applied to the ship's propeller shaft is in the astern direction, and this is particularly important to the operator when the ship is traveling in the ahead direction and the astern torque is applied to the propeller shaft to decrease the forward speed of the ship. In the usual ship power plant an astern or reversing turbine is employed so that when the indicator (astern) lamp 241 is illuminated it serves as a signaling indication to the operator that the astern turbine is in operation and applying the reversing torque to the ship's propeller shaft.

The cam latching assembly CL is provided for operating the micro switch 238 to illuminate the indicating lamp 241 to inform the operator that the torque or direction of rotation then acting in the shaft 62 is in a particular direction. As will be readily recognized, the application of my invention to a direct reading shaft horsepower meter system as disclosed in my application Serial No. 226,866, the astern torque may be temporary or may take place and continue over a protracted period of time. The astern torque condition is temporary when, for example, the propeller shaft is rotating in the ahead direction and a rapid deceleration or stop may be required. Under such conditions the astern turbine of the ship is put into operation, causing a negative shaft horsepower to be applied into the shaft to stop the ship and reverse direction, or to slow it down, and when such operations occur, the astern lamp 241 is illuminated to advise the operator that the propeller shaft has had and is having astern torque applied thereto.

Since the shaft 62 normally rotates clockwise and counterclockwise each through 360° and thus has a full or complete deflection of approximately 720°, a conventional cam mechanism cannot be used for operating the indicating lamp controlling micro-switch 238 because such a cam mechanism would repeat itself and effect operation of switch 238 when going from one direction to the other after the shafting has completed rotation through only 180° in one direction. Since only the lamp 241 is to be active and illumated during the direction of rotation of the shaft in one direction, it will be recognized that any such repetitive illumination of the lamp is undesirable; hence, by my present invention I have solved this problem by the cam latching assembly CL of the example thereof as used in the present system of the invention. The cam latching assembly CL is only in latched and operating position to actuate the switch 238 to effect illumination of the lamp 241 when the rotation of shaft 62 is in one direction. When the shaft is operating in the opposite direction the cam latching assembly CL will be unlatched and inactive to operate the switch 238 to closed position for effecting illumination of the lamp 241. The cam latching assembly includes the circular disc or cam plate 300 which is freely mounted on the shaft section 62 of the shafting driven by the servo motor SM for rotation of the shaft independently of the cam disc when the assembly is in active condition of operation. The servo motor SM functions with bidirectional limit stops and slip-clutch to limit the travel of shaft 62 in either direction to avoid repetition of the cam action. Any suitable means may be provided for determining the direction and extent of rotation of servo motor SM, such for example, in my pending application, this extent and direction of rotation is determined by the torque signal voltage developed as a differential voltage between a shaft mounted transducer and a further transducer, by the current developed in a servo amplifier. This amplified current flows to the control windings of the servo motor.

An arcuate latching arm 301 is pivotally mounted by the headed pivot pin 302 on one side of the cam disc 300 in position along and adjacent the periphery of the cam disc 300. Latching arm 301 has its outer edge surface formed on a radius of curvature the same as that of the cam disc 300 so that in one position thereof, being the inactive position of the cam latching assembly as shown in FIG. 1, the outer edge of this locking arm lies substantially in the plane of the peripheral edge of the cam disc 300. One end of the pivotally mounted locking arm 301 is provided with the shoulder 303 at the inner side or edge of the arm, being the upper end of the arm when the latching cam assembly is in the inactive position of FIG. 1.

A pusher arm 304 is mounted on shaft 62 for rotation therewith. Pusher arm 304 is positioned and fixed onto shaft 62 at and immediately adjacent the side of the cam disc 300 on which the latching arm 301 is mounted and with the cam latching assembly CL in its normal, inactive position, the cam disc 300 with latching arm 301, remains stationary while pusher arm 304 rotates with shaft 62 but clear of and out of engagement with latching arm 301 and its shoulder 303 when it rotates therepast. In order to limit the horizontal movement of cam 300, which is freely mounted on shaft 62, so that the cam 300 will not move too far away and into position disengaged from the pusher arm 304, I have provided an element 316, in the nature of a stop member, and this element 316 is affixed to shaft 62 by pinning or screwing and is so located that a small amount of free end play between it and cam 300 is provided. This construction provides unrestricted rotation for cam 300 when in an unlatched condition to avoid the dragging of the cam which may result in spurious alarms. A smooth recess 306 matching the curve of follower roller 309 is provided in the periphery of the cam plate 300. (See FIG. 4.) When the cam latching assembly CL is in its inactive position shown in FIG. 1, the notch 306 is located at the lower side of cam disc 300 and latching arm 301 in transverse alignment. The switch unit 238 is of the micro switch type and includes the switch actuating plunger 307, which, as will be understood by those familiar with this type of switch, is spring loaded and in normal switch open position thereof projects upwardly from the switch unit in the position as shown in FIG. 1. The switch unit includes the resilient operating arm 308 formed of flat spring material. The operating arm 308 extends over and transversely across the outer end of the actuating plunger 307. The roller 309 is mounted on the outer end of this operating arm 308 on the upper side thereof for free rotation thereon. The switch unit 238 is so mounted relative to the cam latching assembly CL that when the cam latching assembly is in the inactive position of FIG. 1, the aligned notch 306 is at the lowermost part of cam disc 300 and latching arm 301 with the roller 309 of the switch operating arm 308 aligned therewith and being projected by arm 308 into position received and seated in the aligned notch and with the switch actuating pin 307 in its projected, switch open position so that the circuit formed by the conductors 239 and 239a is open and the astern lamp 241 is unlit and gives no visual signal.

A pin 310 is mounted on one side of cam disc 300 in position extending therefrom at a location spaced inwardly from the latching arm 301 and approximately opposite the headed pivot pin 302 when the assembly is in the inactive position of FIG. 1. When the shaft 62 is rotated in the astern direction and the direction of rotation of the pusher arm 304 is thereby reversed, this arm engages and pushes against pin 310 and picks up and rotates the cam disc 300 along and in the same direction with the rotation of shaft 62 and the pusher arm 304.

A pin 311 is mounted and fastened into latching arm 301 adjacent the shoulder 303 and this pin extends transversely through an elongated or acuate slot 312 formed through cam disc 300 in a generally radially disposed position relative to the axis of the cam disc. On the side of cam disc 300 opposite the side on which latching arm 301 is mounted, a pin 314 is fixed to the disc in position spaced from pin 311 and a spring 315 is connected at one end to pin 314 and at its opposite end to the pin 311 that is movably confined in the slot 312. Spring 315 continuously acts on latching arm 301 in a direction to swivel latching-arm 301 about axis 302 in a direction to swing the back end of latching arm 301 therein outwardly to the position as shown in FIG. 3.

When the shaft 62 is rotated in the astern or a particular direction, the pusher arm 304 is rotated with shaft 62 to engage against pin 310 and pusher arm 304 against shoulder 303 to thus rotate cam disc 300 along with shaft 62 in either direction while under astern torque action. This rotation of the cam disc with the latching arm 301 moves the recess 306 from position receiving the switch operating arm roller 309 so that the roller 309 thereafter rides up onto the peripheral or camming edge of cam disc 300 and is thus forced outwardly from the cam center to thereby force switch operating arm 308 to be displaced with resulting depression of the switch actuating plunger 307 to switch closing position. When the switch is closed, the circuit to the lamp 241 is closed, and the lamp is illuminated. When the recess 306 is moved clear of roller 309, the tension spring 315 on the cam disc 300 takes over and pulls pin 311 within the slot 312 to its limit which in turn pulls the end of the latching arm 301 having the shoulder 303 therein, inwardly toward the axis of the cam member 300. This results in the pusher arm 304 outward and latching under the shoulder 303 and thus holds these members locked in place during the entire period of operation in a particular direction.

When the shaft rotates in the opposite direction and the shaft 62 has reached a position with respect to the servo drum SD in the opposite direction, then the detent recess 306 moves to a position opposite roller 309, and then under the spring action of arm 308, roller 309 is moved back into the detent recess, and the latching arm 301 is swiveled inwardly which thereby swings the end of the latching arm having shoulder 303 outwardly and releases the pusher arm 304 to unlatched position relative to the latching arm 301 so that the pusher arm 304 is free to rotate clear of the latching arm.

It is to be noted that when the switch cam follower roller 309 is out of the detent recess 306, the pin 311 will slide freely in the slot 312 and functions as the limit stop for both directions of movement of the pin. This, therefore, limits the back end of latching arm 301 from moving excessively outwardly to thereby prevent the roller 309 from coming back into the detent recess. By limiting the travel of the latching arm 301 the end thereof is positioned so that switch roller 309 is not prevented from freely entering the recess by latching arm 301 extended too far outward.

By the foregoing construction and combination of the micro switch 238 and the cam latching assembly CL, the lamp 241 is always illuminated during astern torque operation or rotation in a particular direction and is always extinguished during rotation in the opposite direction.

I claim:

1. In combination, a rotary shaft mounted for rotation in a normal direction and for rotation in a reverse direction, means limiting the degree of rotation of said shaft in either direction, a normally open switch having a switch operating member and an actuating arm therefor; said actuating arm having an enlargement at one end thereof; a cam disc mounted on said rotary shaft and being unattached to said shaft for rotation of the latter independently relative thereto; said cam disc having a peripheral recess therein for receiving said enlargement on said switch operating arm when said switch is in normal open position; and means mounted on said shaft adjacent said cam disc for rotation of said means in either direction with said shaft; further means on said cam disc engageable by said means when said shaft rotates in the reverse direction to thereby rotate said cam disc, move said enlargement outside the recess in the periphery of the cam disc and in engagement with the periphery of said cam disc for closing of said normally open switch.

2. In the combination of claim 1, wherein said means comprises a pusher arm extending radially from said shaft at one side of said cam disc.

3. In the combination of claim 1, wherein said further means comprises a latching arm pivotally mounted on and carried by said cam disc at the side thereof at which said means is located.

4. In the combination of claim 1, wherein said further means comprises a latching arm pivotally mounted on and carrier by said cam disc at the side thereof at which said means is located; one end of said latching arm having a shoulder formed therein at the inner side thereof; a pin member fixed to said latching arm adjacent the end thereof having said shoulder therein; said cam disc having an arcuate slot therethrough and said pin member extending through said slot for movements therein; a spring member connected at one end to said cam disc at the side thereof opposite said latching arm and being connected at its other end to the end of said pin member; a cam disc driving pin fixed on said cam disc in position for engagement by said means during reverse rotation of said shaft to rotate said cam disc to swivel said latching arm to position roller clear of said recess to a position with said cam disc engaging said enlargement on said switch actuating arm to force said arm to position closing said switch and with said means latched under said shoulder of said latching arm; and said means during normal rotation of said shaft disengaging said latching arm and said cam disc driving pin for seating of said enlargement of said switch actuating arm in said recess in said cam disc for switch open position of said switch actuating arm during normal direction of rotation of said rotary shaft.

5. In combination, a rotary shaft mounted for rotation in a normal direction and for rotation in a reverse direction, means limiting the degree of rotation of said shaft in its normal direction and the degree of rotation thereof in its reverse direction; a normally open switch having a switch operating member and an actuating arm therefor; said actuating arm having a roller member at one end thereof; a cam disc mounted on said rotary shaft with the periphery thereof in camming engagement with said roller member on said switch actuating arm for forcing said arm to switch closing position; said cam disc being unattached to said shaft for rotation of the latter independently relative thereto; said cam disc having a peripheral recess therein for receiving said roller on said switch actuating arm for releasing the latter for return to normal switch open position; a pusher arm fixed on said shaft for rotation therewith in either normal or reverse direction of rotation; said pusher arm being positioned on and extending radially from said shaft at one side of said cam disc; a latching arm pivotally mounted on and carried by said cam disc at the side thereof at which said pusher arm is located; one end of said latching arm having a shoulder formed therein at the inner side thereof; a pin member fixed to said latching arm adjacent the end thereof having said shoulder therein; said cam disc having an arcuate slot therethrough and said pin therein; a spring member connected at one end to said cam disc at the side thereof opposite said latching arm and being connected at its other end of said pin member; a cam disc driving pin fixed on said cam disc in position for engagement by said pusher arm during reverse rotation of said shaft to rotate said cam disc to swivel said latching arm to position roller clear of said recess to a position with said cam disc engaging said roller on said switch actuating arm to force said arm to position closing said switch and with said pusher arm latched under said shoulder of said latching arm; and said pusher arm during normal rotation of said shaft disengaging said latching arm and said cam disc driving pin for seating of said roller member of said switching arm in said recess in said cam disc for switch open position of said switch actuating arm during normal direction of rotation of said rotary shaft.

References Cited by the Examiner
UNITED STATES PATENTS

| 1,851,227 | 3/1932 | Whittingham. | |
| 2,116,842 | 5/1938 | Metcalf | 200—153 X |
| 2,148,489 | 2/1939 | Metcalf | 200—153 X |

ROBERT K. SCHAEFER, *Primary Examiner.*

H. J. HOHAUSER, *Assistant Examiner.*